(12) United States Patent
Cheng et al.

(10) Patent No.: US 11,348,104 B2
(45) Date of Patent: May 31, 2022

(54) METHODS AND DEVICES FOR ACQUIRING AND RECORDING TRACKING INFORMATION ON BLOCKCHAIN

(71) Applicant: Advanced New Technologies Co., Ltd., Grand Cayman (KY)

(72) Inventors: Long Cheng, Zhejiang (CN); Yanpeng Li, Zhejiang (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 46 days.

(21) Appl. No.: 16/737,071

(22) Filed: Jan. 8, 2020

(65) Prior Publication Data
US 2020/0294032 A1 Sep. 17, 2020

Related U.S. Application Data

(63) Continuation of application No. PCT/CN2019/078169, filed on Mar. 14, 2019.

(51) Int. Cl.
*G06Q 20/38* (2012.01)
*G06Q 20/36* (2012.01)
(Continued)

(52) U.S. Cl.
CPC ....... *G06Q 20/389* (2013.01); *G06Q 20/3672* (2013.01); *G06Q 20/3674* (2013.01); *G06Q 20/40145* (2013.01); *H04L 9/0637* (2013.01)

(58) Field of Classification Search
CPC .......... G06Q 20/3674; G06Q 20/3672; G06Q 20/36; G06Q 20/401–40145;
(Continued)

(56) References Cited

U.S. PATENT DOCUMENTS 5,613,012 A * 3/1997 Hoffman .................. G07F 9/002
   382/115
8,571,985 B1 * 10/2013 Grigg ...................... G06Q 40/02
   705/35
(Continued)

FOREIGN PATENT DOCUMENTS

CN 106372940 A 2/2017
CN 108717431 A 10/2018
(Continued)

OTHER PUBLICATIONS

Andreas M. Antonopoulos, "Mastering Bitcoin", Dec. 2014, O'Reilly Media, Inc.*
(Continued)

*Primary Examiner* — Steven S Kim
(74) *Attorney, Agent, or Firm* — Finnegan, Henderson, Farabow, Garrett & Dunner, LLP (57) ABSTRACT

Disclosed herein are methods, devices, and apparatuses, including computer programs stored on computer-readable media, for acquiring and recording tracking information on a blockchain. One of the methods includes: verifying, by a terminal device, an identity of a user who is to submit transaction data for recordation on the blockchain; acquiring, by the terminal device, tracking information to be submitted with the transaction data for recordation on the blockchain, the tracking information including identity information of the user and a location of the terminal device; generating, by the terminal device, a data package including the tracking information and the transaction data; and submitting, by the terminal device, the data package for recordation on the blockchain.

15 Claims, 8 Drawing Sheets

(51) Int. Cl.
  *G06Q 20/40* (2012.01)
  *H04L 9/06* (2006.01)
(58) Field of Classification Search
  CPC .......... G06Q 10/0833; G06Q 30/0185; G06Q 20/389; G06Q 20/4014; H04L 9/0637
  See application file for complete search history.

(56) References Cited

U.S. PATENT DOCUMENTS

| | | | |
|---|---|---|---|
| 2007/0074034 A1* | 3/2007 | Adams | G06F 21/629 713/176 |
| 2007/0208869 A1* | 9/2007 | Adelman | G06Q 10/107 709/229 |
| 2014/0031011 A1* | 1/2014 | West | G06F 21/44 455/411 |
| 2015/0134530 A1* | 5/2015 | Song | G06Q 20/40145 705/44 |
| 2016/0261411 A1* | 9/2016 | Yau | H04L 63/0492 |
| 2016/0283920 A1* | 9/2016 | Fisher | G06Q 20/02 |
| 2016/0342994 A1* | 11/2016 | Davis | G06Q 20/382 |
| 2016/0371509 A1* | 12/2016 | Unitt | H04L 43/106 |
| 2017/0046664 A1* | 2/2017 | Haldenby | G06Q 20/0655 |
| 2017/0140408 A1* | 5/2017 | Wuehler | G06Q 30/0207 |
| 2017/0250972 A1* | 8/2017 | Ronda | H04L 9/08 |
| 2017/0257358 A1* | 9/2017 | Ebrahimi | H04L 63/083 |
| 2018/0077147 A1* | 3/2018 | Kelsey | H04L 63/0823 |
| 2018/0096347 A1 | 4/2018 | Goeringer et al. | |
| 2018/0096752 A1* | 4/2018 | Ovalle | G07F 17/3227 |
| 2018/0108024 A1* | 4/2018 | Greco | G06Q 30/0185 |
| 2018/0205725 A1* | 7/2018 | Cronkright | H04L 9/0637 |
| 2018/0205743 A1* | 7/2018 | McIver | H04L 9/30 |
| 2018/0260212 A1* | 9/2018 | Wisnovsky | G06F 8/71 |
| 2018/0270065 A1* | 9/2018 | Brown | H04L 63/12 |
| 2018/0276626 A1* | 9/2018 | Laiben | G06Q 20/02 |
| 2018/0285879 A1* | 10/2018 | Gadnis | G06F 16/1805 |
| 2018/0300693 A1* | 10/2018 | Gopinath | G06Q 20/065 |
| 2018/0330342 A1* | 11/2018 | Prakash | G06Q 20/10 |
| 2019/0035018 A1* | 1/2019 | Nolan | G06Q 40/04 |
| 2019/0044700 A1 | 2/2019 | Leddy | |
| 2019/0079950 A1* | 3/2019 | Ramabaja | H04L 9/3239 |
| 2019/0171849 A1* | 6/2019 | Assenmacher | G06F 21/64 |
| 2019/0236602 A1* | 8/2019 | Song | H04L 9/3247 |
| 2019/0319808 A1* | 10/2019 | Fallah | H04L 67/1044 |
| 2019/0334700 A1* | 10/2019 | Callan | H04L 9/0643 |
| 2020/0037158 A1* | 1/2020 | Soundararajan | G06Q 20/3829 |

FOREIGN PATENT DOCUMENTS

| | | | | |
|---|---|---|---|---|
| CN | 109165946 A | | 1/2019 | |
| CN | 109272325 A | | 1/2019 | |
| CN | 109447660 A | | 3/2019 | |
| WO | WQ2019205389 | * | 8/2018 | ............ G06F 21/31 |
| WO | WO 2018/176140 A1 | | 10/2018 | |
| WO | WO 2018/201296 A1 | | 11/2018 | |

OTHER PUBLICATIONS

Written Opinion of the International Searching Authority of PCT Application No. PCT/CN2019/078169, dated Dec. 5, 2019, issued by the ISA/CN—National Intellectual Property Administration, PRC, China.
International Search Report of PCT Application No. PCT/CN2019/078169, dated Dec. 5, 2019, issued by the ISA/CN—National Intellectual Property Administration, PRC, China.
Extended European Search Report for European Application No. 19725893.2, dated May 19, 2020.
Notice of Preliminary Rejection, Korean Application No. 10-2019-7028596, dated Jun. 29, 2021.
Written Opinion of Singapore Application No. 11201908554P, from the Intellectual Property Office of Singapore, dated Dec. 21, 2020.
Examination Report No. 1 for Australian Application No. 2019203859 dated Aug. 14, 2020.
Office Action of Japanese Application No. 2019-552908, dated Mar. 11, 2021.
Examination Report of Canadian Application No. 3,057,396 dated Mar. 25, 2021.

* cited by examiner

METHODS AND DEVICES FOR ACQUIRING AND RECORDING TRACKING INFORMATION ON BLOCKCHAIN

CROSS REFERENCE TO RELATED APPLICATIONS

This application is a continuation of international Application No. PCT/CN2019/078169, filed Mar. 14, 2019, the entire content of which is incorporated herein by reference.

TECHNICAL FIELD

The specification relates generally to computer technologies, and more particularly, to methods and devices for acquiring tracking information and recording the tracking information on a blockchain.

BACKGROUND

Blockchain systems, also known as distributed ledger systems (DLSs) or consensus systems, may enable participating entities to store data securely and immutably. Blockchain systems may include any DLSs, without referencing any particular use case, and may be used for public, private, and consortium blockchain networks. A public blockchain network is open for all entities to use the system and participate in the consensus process. A private blockchain network is provided for a particular entity, which centrally controls read and write permissions. A consortium blockchain network is provided for a select group of entities, which control the consensus process, and includes an access control layer.

A blockchain system maintains one or more blockchains. A blockchain is a data structure for storing data, such as transactions, that may prevent tampering and manipulation of the data by malicious parties.

A blockchain system is implemented using a peer-to-peer (P2P) network, in which the nodes communicate directly with each other, e.g., without the need of a fixed, central server. Each node in the P2P network may initiate communication with another node in the P2P network.

The ability to store data securely and immutably allows blockchain systems to track and trace products transacted on such systems. However, if inaccurate data is stored in a blockchain system, the ability for that blockchain system to accurately track and trace products may be limited. Therefore, there is a need for a method to improve the accuracy of transaction data recorded on blockchains.

SUMMARY

In one aspect, a computer-implemented method for acquiring and recording tracking information on a blockchain includes: verifying, by a terminal device, an identity of a user who is to submit transaction data for recordation on the blockchain; acquiring, by the terminal device, tracking information to be submitted with the transaction data for recordation on the blockchain, the tracking information including identity information of the user and a location of the terminal device; generating, by the terminal device, a data package including the tracking information and the transaction data; and submitting, by the terminal device, the data package for recordation on the blockchain.

In another aspect, a terminal device for recording tracking information of transaction data on a blockchain includes: one or more processors; and one or more computer-readable memories coupled to the one or more processors and having instructions stored thereon. The instructions are executable by the one or more processors to: verify an identity of a user who is to submit transaction data for recordation on the blockchain; acquire tracking information to be submitted with the transaction data for recordation on the blockchain, the tracking information including identity information of the user and a location of the terminal device; generate a data package including the tracking information and the transaction data; and submit the data package for recordation on the blockchain.

In still another aspect, a non-transitory computer-readable medium has stored therein instructions that, when executed by a processor of a terminal device, cause the terminal device to perform a method for acquiring and recording tracking information on a blockchain. The method includes: verifying, by the terminal device, an identity of a user who is to submit transaction data for recordation on the blockchain; acquiring, by the terminal device, tracking information to be submitted with the transaction data for recordation on the blockchain, the tracking information including identity information of the user and a location of the terminal device; generating, by the terminal device, a data package including the tracking information and the transaction data; and submitting, by the terminal device, the data package for recordation on the blockchain.

BRIEF DESCRIPTION OF THE DRAWINGS

The accompanying drawings, which are incorporated in and constitute a part of this specification, illustrate embodiments. In the following description, which refers to the drawings, the same numbers in different drawings represent the same or similar elements unless otherwise represented.

DETAILED DESCRIPTION

Embodiments of the specification provide methods and devices for acquiring and recording tracking information of transaction data submitted for recordation on blockchains. The methods and devices verify user identities before a user is allowed to submit transaction data for recordation on a blockchain. The methods and devices also acquire tracking information to supplement the transaction data and record the tracking information on the blockchain. In some embodiments, the tracking information includes information about the user, the location of the user, and a unique identifier that identifies each product involved in the transaction. This tracking information can then be validated by a consensus process provided by the blockchain system to ensure that the transaction data recorded on the blockchain is accurate and consistent.

Embodiments disclosed in the specification have one or more technical effects. In some embodiments, the methods and devices provide the abilities to verify the identities of the users. This allows for better accountability and reduces the likelihood of the blockchain system receiving false transaction data from ill-intentioned users. In other embodiments, the methods and devices provide the abilities to securely manage public and private keys for the users, thereby further improving accountability and data quality. In still other embodiments, the methods and devices have the ability to verify and record user locations without user intervention. This allows the blockchain system to retain records with improved traceability and prevents data tampering. In still other embodiments, the methods and devices have the ability to identify products being transacted in the blockchain system. This allows the blockchain system to recognize inadvertent or intentional misplacement of products. In still other embodiments, the methods and devices use smart contracts in the blockchain system to verify the legitimacy of transaction data submitted by users. This provides the blockchain system with the abilities to detect transaction errors. Practically, the methods and devices improve accuracy of transaction data recorded on blockchains and allow blockchain systems to use the recorded transaction data to accurately track and trace products transacted on such blockchains.

A blockchain is a data structure that stores data, e.g., transactions, in a way that the transactions may be immutable and subsequently verified. A blockchain includes one or more blocks. Each block is linked to a previous block immediately before it in the blockchain by including a cryptographic hash of the previous block. Each block also may include a timestamp, its own cryptographic hash, and one or more transactions. The transactions, which generally have already been verified by the nodes of the blockchain system, may be hashed and encoded into a data structure, such as a Merkle tree. In a Merkle tree, data at leaf nodes of the tree is hashed, and all hashes in each branch of the tree may be concatenated at a root of the branch. This process continues up the tree to the root of the entire tree, which stores a hash that is representative of all data in the tree. A hash purporting to be of a transaction stored in the tree can be quickly verified by determining whether it is consistent with the structure of the tree.

A blockchain system includes a network of computing nodes that manage, update, and maintain one or more blockchains. The network may be a public blockchain network, a private blockchain network, or a consortium blockchain network. For example, numerous entities, such as hundreds, thousands, or even millions of entities, can operate in a public blockchain network, and each of the entities operates at least one node in the public blockchain network. Accordingly, the public blockchain network can be considered a public network with respect to the participating entities. Sometimes, a majority of entities (nodes) must sign every block for the block to be valid and added to the blockchain of the blockchain network. Examples of public blockchain networks include particular peer-to-peer payment networks that leverage a distributed ledger, referred to as blockchain.

In general, a public blockchain network may support public transactions. A public transaction is shared with all of the nodes in the public blockchain network, and is stored in a global blockchain. A global blockchain is a blockchain replicated across all nodes, and all nodes are in perfect state consensus with respect to the global blockchain. To achieve consensus (e.g., agreement to the addition of a block to a blockchain), a consensus protocol is implemented in the public blockchain network. Examples of consensus protocols include proof-of-work (POW) (e.g., implemented in the some crypto-currency networks), proof-of-stake (POS), and proof-of-authority (POA).

In general, a private blockchain network may be provided for a particular entity, which centrally controls read and write permissions. The entity controls which nodes are able to participate in the blockchain network. Consequently, private blockchain networks are generally referred to as permissioned networks that place restrictions on who is allowed to participate in the network, and on their level of participation (e.g., only in certain transactions). Various types of access control mechanisms can be used (e.g., existing participants vote on adding new entities, a regulatory authority can control admission).

In general, a consortium blockchain network may be private among the participating entities. In a consortium blockchain network, the consensus process is controlled by an authorized set of nodes, one or more nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network. Accordingly, the consortium blockchain network can be considered a private network with respect to the participating entities. In some examples, each entity (node) must sign every block in order for the block to be valid, and added to the blockchain. In some examples, at least a sub-set of entities (nodes) (e.g., at least 7 entities) must sign every block in order for the block to be valid, and added to the blockchain.

Figure 1:
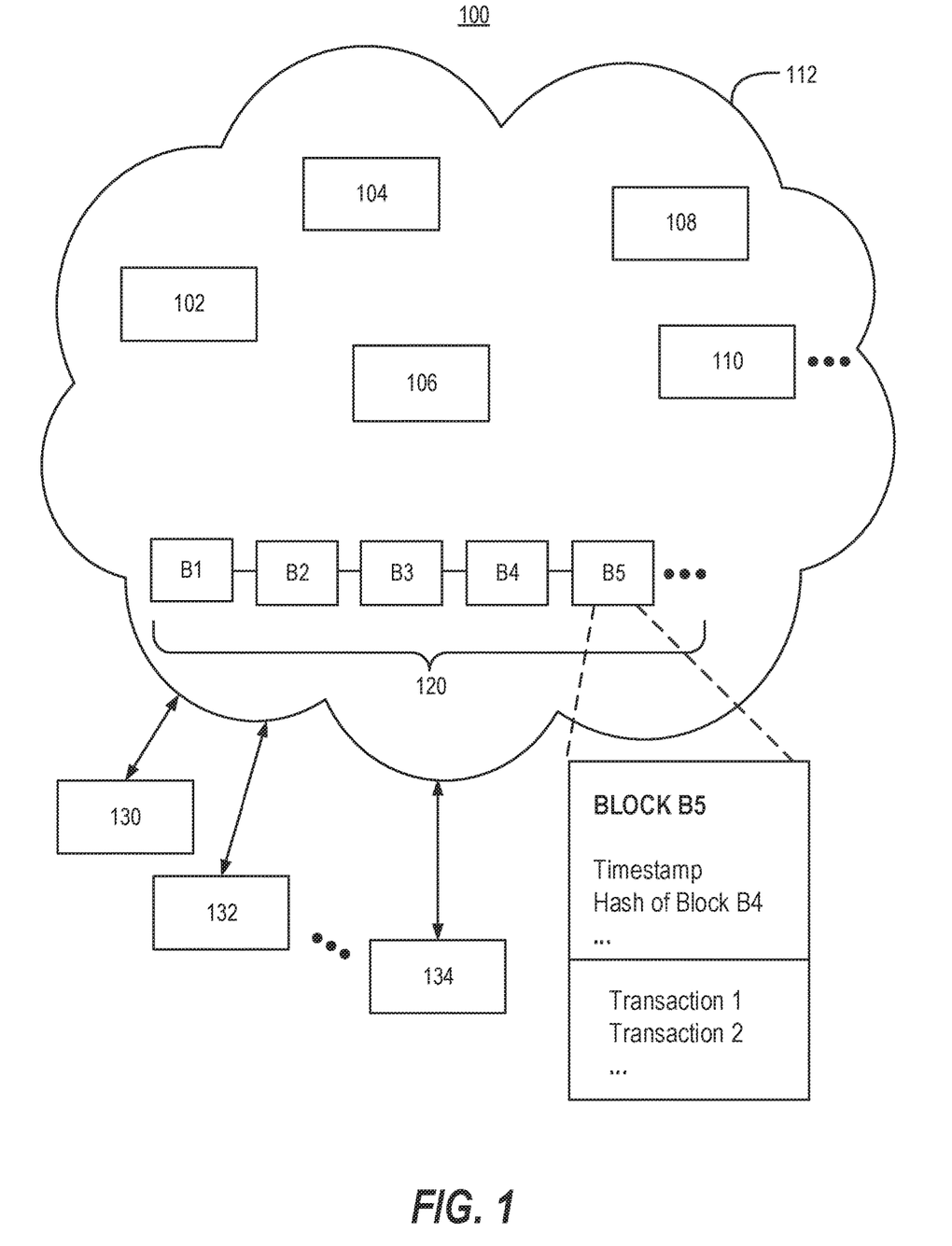
FIG. 1 is a schematic diagram of a blockchain system, according to an embodiment.

FIG. 1 illustrates a schematic diagram of a blockchain system 100, according to an embodiment. Referring to FIG. 1, the blockchain system 100 may include a plurality of nodes, e.g., nodes 102-110, configured to operate on a blockchain 120. The nodes 102-110 may form a network 112, such as a peer-to-peer (P2P) network. Each of the nodes 102-110 may be a computing device, such as a computer or a computer system, configured to store a copy of the blockchain 120, or may be software running on the computing device, such as a process or an application. Each of the nodes 102-110 may have a unique identifier.

The blockchain 120 may include a growing list of records in the form of data blocks, such as blocks B1-B5 in FIG. 1. Each of the blocks B1-B5 may include a timestamp, a cryptographic hash of a previous block, and data of the present block, which may be transactions such as monetary transactions. For example, as illustrated in FIG. 1, block B5 may include a timestamp, a cryptographic hash of block B4, and transaction data of block B5. Also, for example, a hashing operation may be performed on the previous block to generate the cryptographic hash of the previous block. The hashing operation may convert inputs of various lengths into cryptographic outputs of a fixed length through a hash algorithm, such as SHA-256.

The nodes 102-110 may be configured to perform an operation on the blockchain 120. For example, when a node, e.g., the node 102, wants to store new data onto the blockchain 120, that node may generate a new block to be added to the blockchain 120 and broadcast the new block to other nodes, e.g., the nodes 104-110, in the network 112. Based on legitimacy of the new block, e.g., validity of its signature and transactions, the other nodes may determine to accept the new block, such that the node 102 and the other nodes may add the new block to their respective copies of the blockchain 120. As this process repeats, more and more blocks of data may be added to the blockchain 120.

Figure 2:
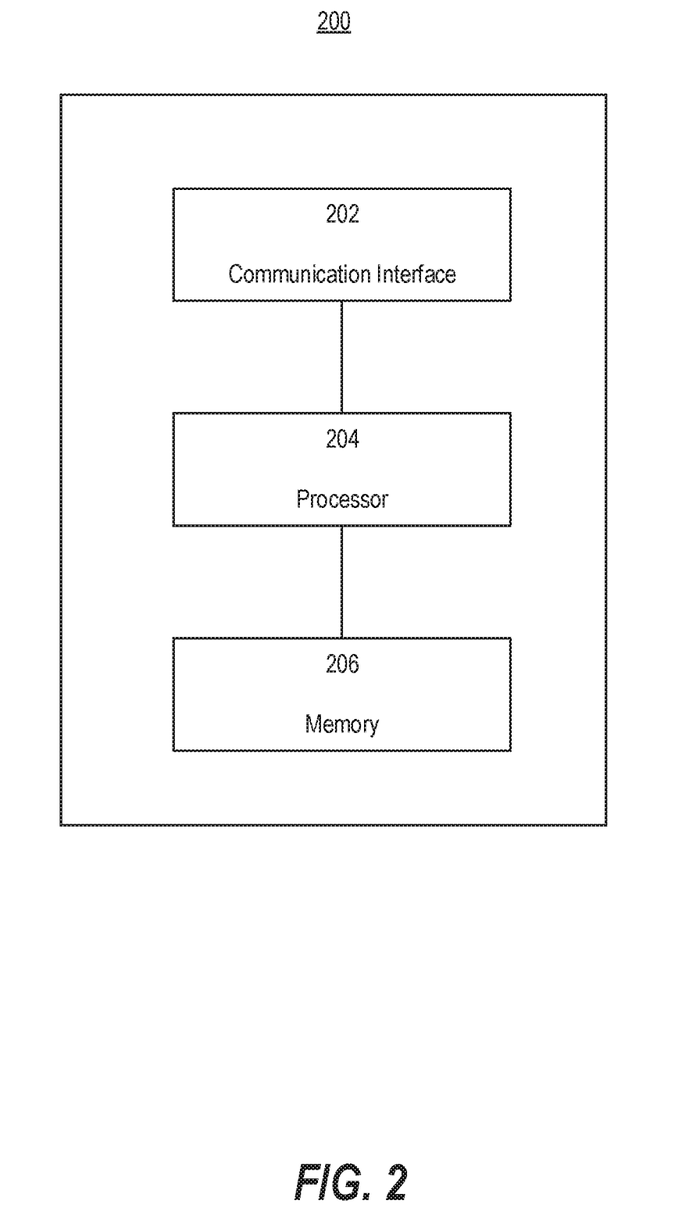
FIG. 2 is a schematic diagram of a computing device for implementing a node in a blockchain system, according to an embodiment.

FIG. 2 illustrates a schematic diagram of a computing device 200 for implementing a node, e.g., the node 102 (FIG. 1), in a blockchain system, according to an embodiment. Referring to FIG. 2, the computing device 200 may include a communication interface 202, a processor 204, and a memory 206.

The communication interface 202 may facilitate communications between the computing device 200 and devices implementing other nodes, e.g., nodes 104-110 (FIG. 1), in the network. In some embodiments, the communication interface 202 is configured to support one or more communication standards, such as an Internet standard or protocol, an Integrated Services Digital Network (ISDN) standard, etc. In some embodiments, the communication interface 202 may include one or more of a Local Area Network (LAN) card, a cable modem, a satellite modem, a data bus, a cable, a wireless communication channel, a radio-based communication channel, a cellular communication channel, an Internet Protocol (IP) based communication device, or other communication devices for wired and/or wireless communications. In some embodiments, the communication interface 202 may be based on public cloud infrastructure, private cloud infrastructure, hybrid public/private cloud infrastructure.

The processor 204 may include one or more dedicated processing units, application-specific integrated circuits (ASICs), field-programmable gate arrays (FPGAs), or various other types of processors or processing units. The processor 204 is coupled with the memory 206 and is configured to execute instructions stored in the memory 206.

The memory 206 may store processor-executable instructions and data, such as a copy of the blockchain 120 (FIG. 1). The memory 206 may include any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, or a magnetic or optical disk. When the instructions in the memory 206 are executed by the processor 204, the computing device 200 may perform an operation on the blockchain 120.

Referring back to FIG. 1, the blockchain system 100 may operate according to one or more smart contracts. Each smart contract may be a computer protocol in the form of computer code that is incorporated into the blockchain 120, to facilitate, verify, or enforce the negotiation or performance of a contract. For example, a user of the blockchain system 100 may program agreed terms into a smart contract using a programming language, such as C++, Java, Solidity, Python, etc., and when the terms are met, the smart contract may be automatically executed by the blockchain system 100, e.g., to perform a transaction. Also for example, the smart contract may include a plurality of subroutines or functions, each of which may be a sequence of program instructions that performs a specific task. The smart contract may be operational code that is fully or partially executed without human interaction.

Users may utilize the blockchain system 100 to conduct transactions, including merchandise transactions. For example, if a first user agrees to deliver a particular product to a second user and the second user agrees to pay the first user a particular amount upon receipt of the product, the two users may create a computer program containing a set of rules that defines their agreements as a smart contract, which may be recorded on the blockchain 120. The smart contract may specify, for example, an identifier of the product, a delivery date, a delivery location, and a payment amount. The smart contract may also specify as a condition if the identified product is delivered on the specified delivery date at the specified delivery location, the second user must transfer the payment amount to an account associated with the first user. When the product is delivered as specified, the condition for the smart contract is satisfied and the blockchain system 100 can enforce the payment automatically.

In some embodiments, the smart contract may have an associated data field, which can be used to record data regarding the transaction. Continuing with the example above, the blockchain system 100 may require recordation of transaction data when each user takes an action towards completing the transaction. The blockchain system 100 may also require recordation of transaction data when a user comes into possession of the product or when the product changes hands from one user to another. For example, the blockchain system 100 may require the first user to record transaction data indicating the time and location when the product is dropped off for delivery. The blockchain system 100 may also require the second user to record transaction data indicating the time and location upon receipt of the product. If a carrier is involved in this transaction, the carrier may also be required to record transaction data in the data field of the smart contract. The transaction data recorded by the carrier may include, e.g., information regarding the delivery route along with timestamps.

The blockchain system 100 may further require all users to verify their identities before allowing them to record the transaction data on the blockchain 120. In some embodiments, the users may be required to use terminal devices to interact with the blockchain system 100, and the terminal devices may carry out this verification process. If a user fails the verification, that user may be prevented from recording the transaction data on the blockchain 120. In this manner, each action taken towards completing a transaction can be traced to a particular user, providing better accountability and reducing the likelihood of receiving false transaction data from ill-intentioned users.

Referring to FIG. 1, a plurality of terminal devices, e.g., terminal devices 130-134, may be used by various users to interact with the blockchain system 100. Each of the terminal devices 130-134 may be a computing device similar to the computing device 200 (FIG. 2), which may include a communication interface, a processor, and a memory, or may be software running on the computing device, such as a process or an application. Each of the terminal devices 130-134 may be, for example, a mobile or handheld device, a computer, a point-of-sale device, an inventory management device, or a package tracking device. In some embodiments, each of the terminal devices 130-134 may need to satisfy certain requirements to be qualified to interact with the blockchain system 100. Qualified terminal devices, e.g., the terminal devices 130-134, may interact with the blockchain system 100 through connections established with one or more nodes, e.g., the nodes 102-110, of the blockchain system 100. The connections may be established through one or more application programming interfaces (APIs). Software development kits (SDKs) may also be provided to facilitate the establishment of such connections.

Figure 3:
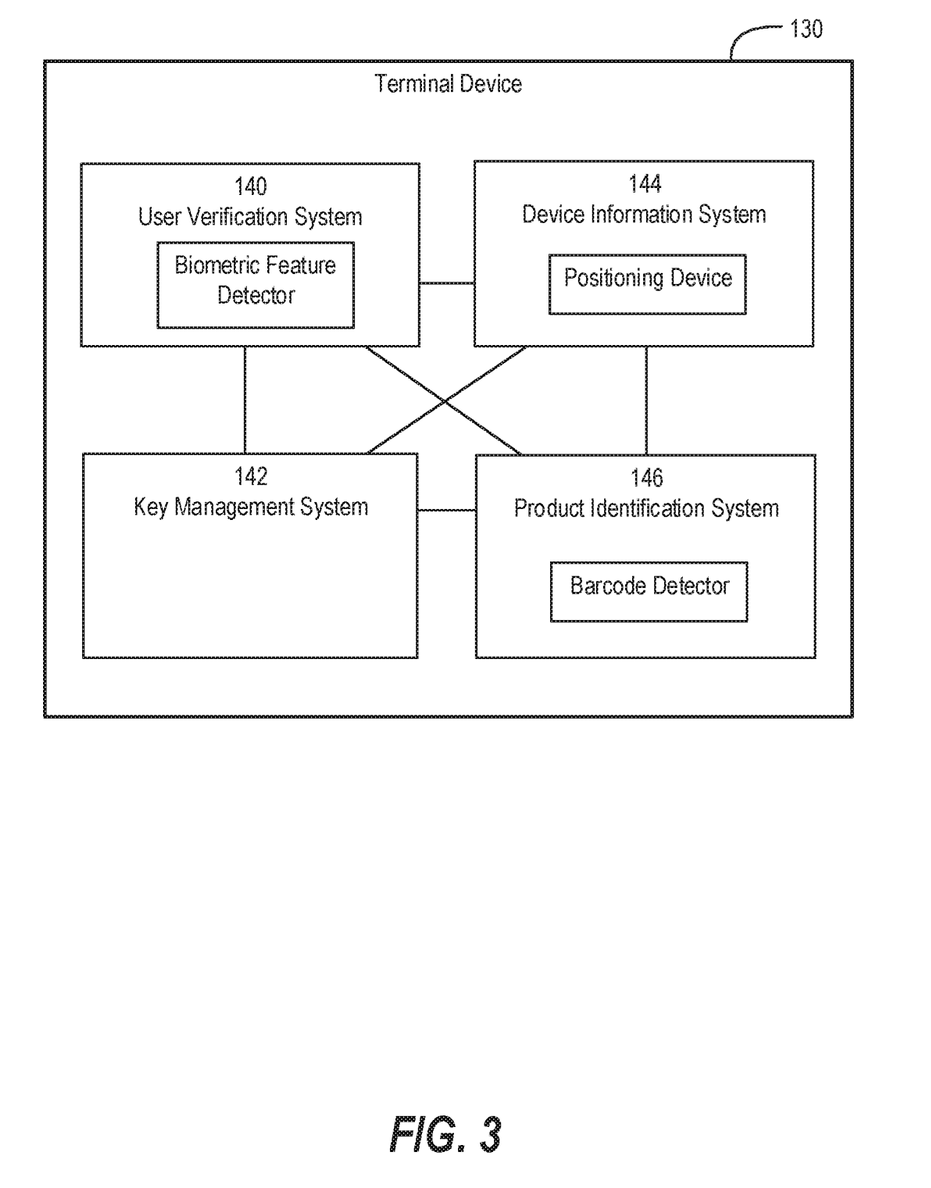
FIG. 3 is a schematic diagram of a terminal device, according to an embodiment.

FIG. 3 illustrates a schematic diagram of a terminal device, e.g., the terminal device 130 (FIG. 1), according to an embodiment. The terminal device 130 may include a plurality of modules, including a user verification system 140, a key management system 142, a device information system 144, and a product identification system 146. In some embodiments, the user verification system 140, the key management system 142, the device information system 144, and the product identification system 146 may include some dedicated hardware components. For example, the user verification system 140 may include a biometric feature detector that can be utilized to collect biometric data and verify identities of users based on the collected biometric data. The device information system 144 may include a positioning device, such as a satellite-based position location system or a cellular triangulation system, that can be used to determine the location of the terminal device 130. The product identification system 146 may include a barcode detector, a camera, a radio frequency sensor, or an optical sensor capable of recognizing, sensing, detecting, or identifying a product.

In some embodiments, the biometric feature detector may include one or more biometric sensors that can be utilized to collect biometric data from users. The biometric sensors may include one or more fingerprint sensors, palm print sensors, iris sensors, retina sensors, face recognition sensors, voice recognition sensors, and the like. These biometric sensor(s) may collect biometric data that relates to users' physiological characteristics, including, e.g., fingerprints, palm prints, iris features, retinal features, facial features, as well as information regarding users' vascular features, heart rate, skin resistance, temperature, muscle tension, electrodermal activities, and neuronal activities. Some biometric sensor(s) may also collect biometric data that relates to users' behavioral characteristics, including, e.g., speech patterns, writing patterns, signatures, and the like.

It is contemplated that various types of hardware may be utilized to implement the biometric sensors. For example, optical, ultrasonic, or capacitance sensors may be utilized to implement fingerprint sensors. Cameras or infrared sensors may be utilized to implement face recognition sensors and iris sensors. In some embodiments, the biometric sensor(s) may be implemented as integrated components of the terminal device 130. In some embodiments, the terminal device 130 may communicate with one or more separate biometric sensors via a wired or a wireless connection.

In some embodiments, the terminal device 130 may utilize the user verification system 140 to verify the identities of the users based on biometric data collected from the biometric sensor(s). The user verification system 140 may compare the biometric data collected from the biometric sensor(s) against a set of biometric data previously collected by the user verification system 140 and determine whether there is a match. In some embodiments, the user verification system 140 may also determine a confidence score indicating the degree that the user verification system 140 can reliably decide whether such a match exists. In some embodiments, the user verification system 140 may consider the identity of a user as being "verified" if it is determined that the biometric data collected from the user matches a set of biometric data previously collected by the user verification system 140 and the confidence score of the match is above a predetermined threshold. For example, the predetermined threshold may be a value representing a minimum matching degree that the user verification system 140 can decide that a match exists. In some embodiments, the predetermined threshold may be expressed as a percentage value, e.g., 99%. In some embodiments, the predetermined threshold may be determined to keep a false rejection rate of the user verification system 140 within a tolerance range, e.g., 0.1%, meaning that on average, no more than one user out of every 1,000 authorized users may not be recognized by the user verification system 140. The predetermined threshold may also be determined to keep a false acceptance rate of the user verification system 140 within a tolerance range, e.g., 0.05%, meaning that on average, no more than one user out of every 2,000 unauthorized users attempting to breach the user verification system 140 may succeed. It is to be understood that various types of statistical analysis may be carried out to determine the threshold.

In some embodiments, the user verification system 140, the key management system 142, the device information system 144, and the product identification system 146 may also share hardware components with each other. For example, computing resources available on the terminal device 130, such as the communication interface, the processor, and the memory, may be shared by the systems 140-146. It is to be understood that while the systems 140-146 are depicted as separate blocks in FIG. 3, such a depiction is merely illustrative. The systems 140-146 do not need to be physically separated inside the terminal device 130 and the steps depicted as being performed by one of the systems 140-146 may be understood as being performed by the terminal device 130.

In some embodiments, the user verification system 140 may operate in conjunction with the key management system 142 to verify and authenticate users of the terminal device 130. The device information system 144 may provide information about the terminal device 130, including its the location information, and in some embodiments, the device information system 144 may operate without user intervention to prevent data tampering. The product identification system 146 may obtain product identifiers associated with products involved in transactions being processed by the terminal device 130. In this manner, the terminal device 130 may acquire user information, product information, and location information regarding each transaction processed through the terminal device 130.

In some embodiments, the terminal device 130 may record the user information, product information, and location information, collectively referred to as tracking information, on the blockchain 120 to supplement the transaction data recorded on the blockchain 120. In some embodiments, recording the tracking information on the blockchain 120 requires the tracking information pass validation by a consensus process provided by the blockchain system 100. This validation process can help ensure that the tracking information recorded on the blockchain 120 is accurate and consistent. Other terminal devices, e.g., the terminal devices 132 and 134 (FIG. 1), may be implemented in a similar manner. As a result, if there is a need to trace the origin of a particular product, e.g., to determine where that product originated or where it has been through the supply chain, the blockchain system 100 can use the transaction data and the tracking information recorded on the blockchain 120 to make an accurate determination.

Figure 4:
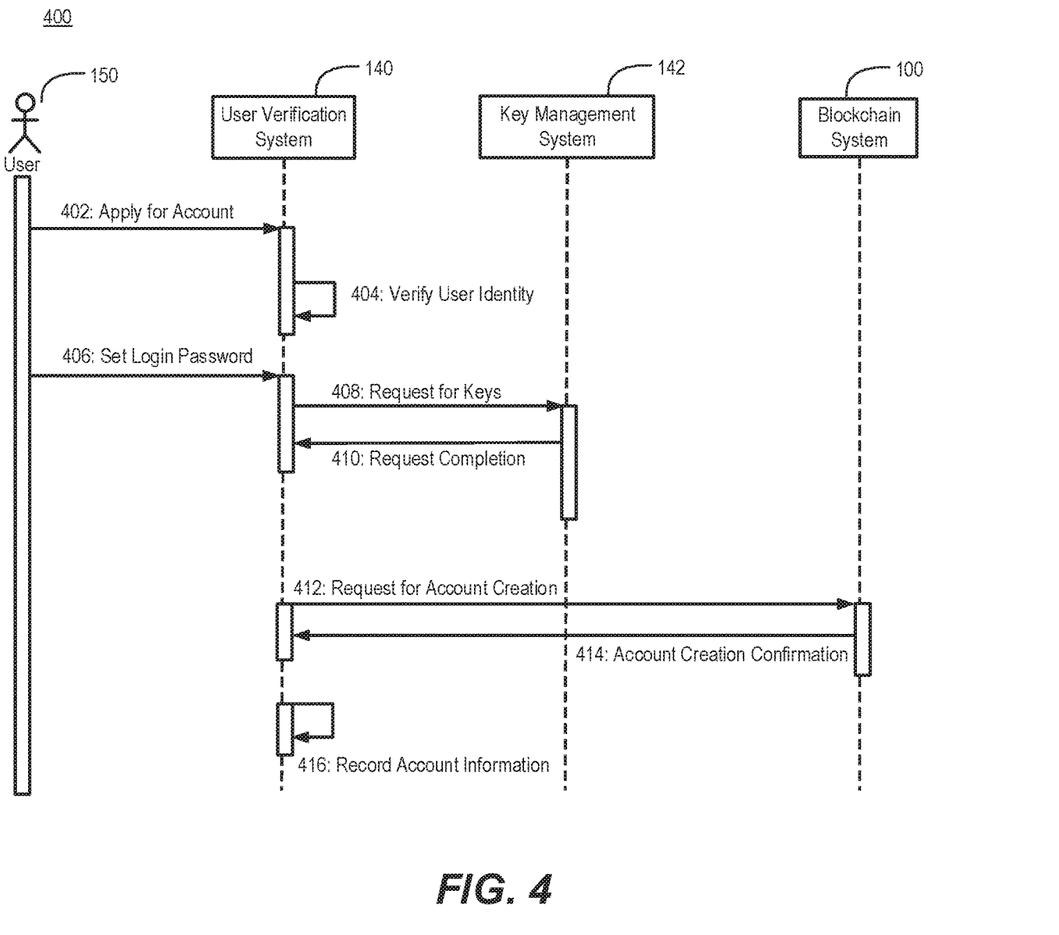
FIG. 4 is a flow chart of a method for processing a request to create a new user account, according an embodiment.

In some embodiments, the blockchain system 100 may require users to verify their identities before allowing them to record any transaction data on the blockchain 120. New users may be required to verify their identities by creating new user accounts through the terminal devices 130-134. FIG. 4 illustrates a flow chart of a method 400 for processing a request to create a new user account, according to an embodiment. The method 400 may be performed by the terminal device 130 (FIG. 3), which may interact with the blockchain system 100 through connections established with one or more nodes, e.g., the nodes 102-110, of the blockchain system 100 (FIG. 1).

Referring to FIGS. 1, 3, and 4, at step 402, the terminal device 130 may receive an application request from a user 150 applying for a new user account. In some embodiments, the application request includes user identity information such as a verifiable identification or biometric feature associated with the user 150. If the blockchain system 100 is implemented on a private blockchain network maintained by a private company, for example, the verifiable identification may include, e.g., an employee identifier. If the blockchain system 100 is implemented on a consortium blockchain network, the verifiable identification may include, e.g., government-issued identification such as the national identification number, resident identity card number, social security number, driver's license number and the like. The biometric feature may include, e.g., face, iris, fingerprint, or voice samples collected by the terminal device 130.

At step 404, the terminal device 130 may instruct its user verification system 140 to verify the validity of the identification and the biometric feature provided by the user 150. The user verification system 140 may communicate with one or more databases containing records of government issued identifications and one or more databases containing records of users' biometric information to perform the required verification. In some embodiments, the user verification system 140 may confirm the validity only if the user 150 has provided a valid identification and a valid biometric feature that match records contained in the databases. Otherwise, if the user 150 does not provide a valid identification, or if the biometric feature provided by the user 150 does not match records contained in the databases, the user verification system 140 may reject the application request.

Once the user's identity is confirmed, the user verification system 140 may request the user 150 to provide a login password for the new user account. This login password may be an alphanumeric password, and the user verification system 140 may impose certain requirements on the password, including, e.g., a minimum number of characters or inclusion of special characters.

At step 406, the user verification system 140 may receive the login password provided by the user 150. The user verification system 140 may then send a request to the key management system 142, at step 408, to create a cryptographic key pair, e.g., a public-private key pair, for the user 150. The key management system 142 may use a suitable algorithm, such as the Elliptic Curve Digital Signature Algorithm (ECDSA) or the Rivest-Shamir-Adleman (RSA) algorithm, to create the cryptographic key pair for the user 150. The key management system 142 may inform the user verification system 140 upon completion of the request at step 410. In some embodiments, the key management system 142 may manage the cryptographic key pair for the user 150 without providing the user 150 direct access to the cryptographic key pair.

At step 412, the user verification system 140 may send a request to the blockchain system 100, e.g., through a connection established with one of the nodes 102-110, to record user information associated with the new user account on the blockchain 120. The user information to be recorded on the blockchain 120 may include, e.g., the identification and the biometric feature provided by the user 150 create the account. In this manner, the user information may be validated by the consensus process provided by the blockchain system 100, which helps improve data accuracy and prevents malicious attacks. In some embodiments, the user information to be recorded on the blockchain 120 may be encrypted or hashed to provide privacy protection.

At step 414, the user verification system 140 may receive a result back from the blockchain system 100 indicating whether the user information was successfully recorded on the blockchain 120. If not, the user verification system 140 may inform the user 150 that a failure has occurred and refuse to allow the user 150 to interact with the blockchain system 100 using the terminal device 130. On the other hand, if the user information is successfully recorded on the blockchain 120, the user verification system 140 may store a local copy of the user information at step 416 and complete the account creation process. The user verification system 140 may use this local copy to facilitate a subsequent request to log into this newly created account.

Figure 5:
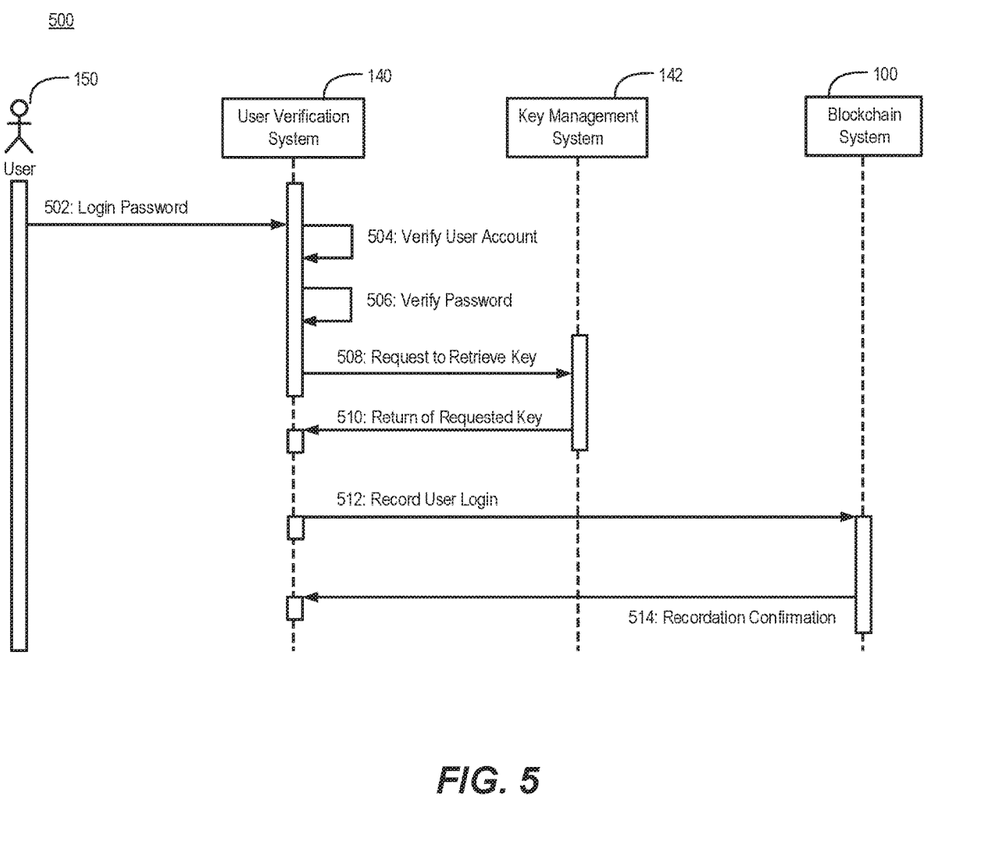
FIG. 5 is a flow chart of a method for processing a user request to log into an existing user account, according to an embodiment.

FIG. 5 illustrates a flow chart of a method 500 for processing a user request to log into an existing user account, according to an embodiment. The method 500 may be performed by the terminal device 130 (FIG. 3), which may interact with the blockchain system 100 through connections established with one or more nodes, e.g., nodes 102-110, of the blockchain system 100 (FIG. 1).

Referring to FIGS. 1, 3, and 5, at step 502, the terminal device 130 may receive a login password from a user 150 who is attempting to log in. At step 504, the terminal device 130 may use its user verification system 140 to collect at least one verifiable biometric feature from the user 150. The user verification system 140 may verify whether the user has an existing account created at the terminal device 130 based on the biometric feature collected from the user 150. For example, the user verification system 140 may verify whether the biometric feature collected from the user 150 matches any biometric features stored locally by the user verification system 140. If not, the user verification system 140 may reject the user's attempt to log in. The user 150 may be presented with an option to create a new user account instead. On the other hand, if the user verification system 140 confirms that the biometric feature collected from the user 150 matches a biometric feature associated with an existing account previously created, e.g., using the terminal device 130, the user verification system 140 may, at step 506, verify whether the login password received from the user 150 matches the password associated with that existing account. If so, the user verification system 140 may send a request to the key management system 142 to retrieve the cryptographic key pair for the user 150. The key management system 142 may then provide the requested cryptographic key pair to the user verification system 140 at step 510.

At step 512, the user verification system 140 may send a request to the blockchain system 100, e.g., through a connection established with one of the nodes 102-110, to record the user's login information as a log entry on the blockchain 120. The user verification system 140 may sign the log entry using the private key of the user 150 provided by the key management system 142. The log entry may include, e.g., the terminal device used to log in, the location of the terminal device, the password entered by the user 150, the biometric feature collected from the user 150, and the login timestamp. In this manner, the log entry may be validated by the consensus process provided by the blockchain system 100, which helps improve data accuracy and prevents malicious attacks. The log entry can also be securely and immutably preserved for record keeping purposes.

At step 514, the user verification system 140 may receive a confirmation result back from the blockchain system 100 indicating whether the log entry was successfully recorded on the blockchain 120. If not, the user verification system 140 may consider the user 150 having failed the login attempt and refuse to allow the user 150 to interact with the blockchain system 100 using the terminal device 130. On the other hand, if the log entry was successfully recorded on the blockchain 120, the user verification system 140 may confirm that the user 150 has logged in successfully and may allow the user 150 to use the terminal device 130 to request recordation of transaction data on the blockchain 120.

Figure 6:
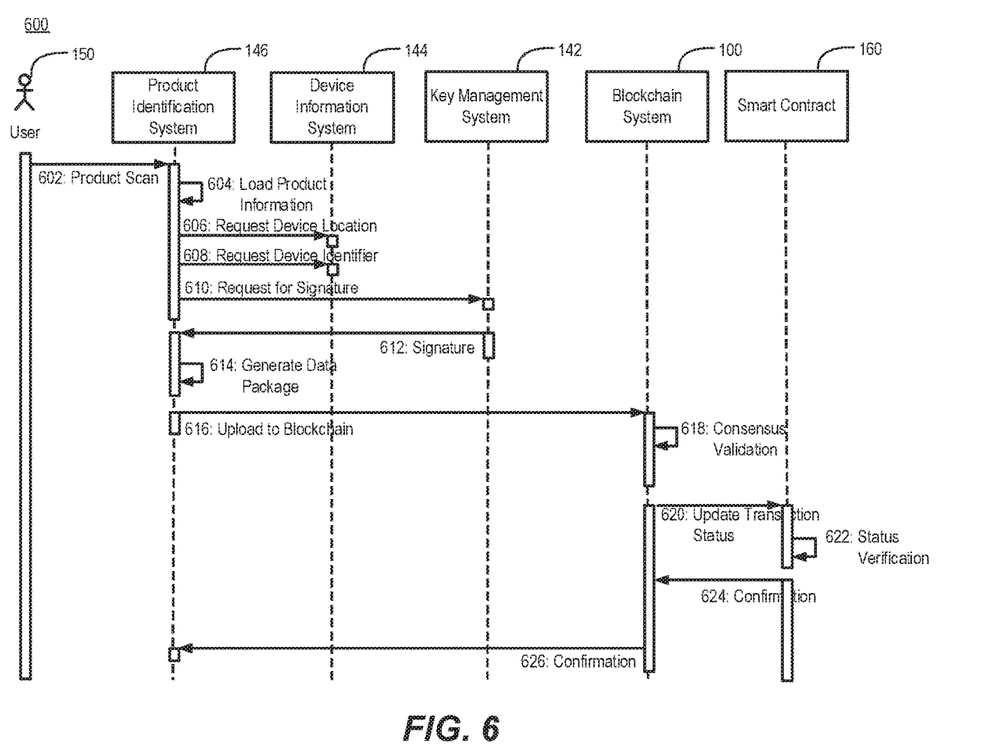
FIG. 6 is a flow chart of a method for acquiring tracking information and recording the tracking information on a blockchain, according to an embodiment.

FIG. 6 illustrates a flow chart of a method 600 for acquiring tracking information and recording the tracking information on a blockchain, according to an embodiment. The method 600 may be invoked, e.g., after the user 150 has successfully logged into an account created on the terminal device 130. The method 600 may be performed by the terminal device 130 (FIG. 3), which may interact with the blockchain system 100 through connections established with one or more nodes, e.g., the nodes 102-110, of the blockchain system 100 (FIG. 1).

Referring to FIGS. 1, 3, and 6, at step 602, the terminal device 130 may receive an instruction from the user 150 to identify a product, e.g., to scan a product code placed on the product. The user 150 may instruct the terminal 130 to do so when, e.g., the user 150 is a party to a smart contract 160 recorded on the blockchain 120 and the user 150 has just received the product as described in the smart contract 160 and wants to update the smart contract 160 to indicate the receipt. Upon receiving the instruction, the terminal device 130 may engage its product identification system 146 to identify the product. In some embodiments, the product identification system 146 may include a barcode reader that can read an identifier placed on the product. In some embodiments, the identifier placed on the product may be an identifier that is unique within a given timeframe or within a given geographical region. In some embodiments, the identifier may be a universally unique identifier. In some embodiments, the product identification system 146 may also include other types of readers, scanners, cameras, radio frequency sensors, or optical sensors capable of recognizing, sensing, detecting, or identifying the product.

Once the product has been identified, the product identification system 146 may, at step 604, use the product identifier to acquire additional information about the product. In some embodiments, the product identification system 146 may acquire product information from one or more databases. The product identification system 146 may also acquire product information from other sources, including product catalogues and the like.

The product identification system 146 may further acquire information about the terminal device 130. For example, at step 606, the product identification system 146 may request the device information system 144 to provide the location of the terminal device 130. At step 608, the product identification system 146 may request the device information system 144 to provide a device identifier that can be used to identify the terminal device 130. The product identification system 146 may then assemble identity information of the user and location information of the terminal device 130, to provide tracking information. In some embodiments, the product identification system 146 may also include the retrieved product information as a part of the tracking information as well.

The product identification system 146 may then record the tracking information on the blockchain 120 to supplement the transaction data the user 150 wants to record. In this manner, the tracking information can be recorded to help validate the accuracy of the transaction data recorded on the blockchain 120. For example, at step 610, the product identification system 146 may send the tracking information to the key management system 142 and request the key management system 142 to sign the tracking information using the private key of the user 150. At step 612, the key management system 142 may return the signed tracking information to the product identification system 146. The product identification system 146 may assemble the signed tracking information together with the transaction data to generate a data package, at step 614.

At step 616, the product identification system 146 may send a request to the blockchain system 100, e.g., through a connection established with one of the nodes 102-110, to record the data package on the blockchain 120. At step 618, the blockchain system 100 may use its consensus process to validate the data package. If the data package passes the validation process, then at step 620, the blockchain system 100 may process the transaction data contained in the data package to update the smart contract 160. Continuing with the example above, if the user 150 is a party to the smart contract 160 and the user 150 just submitted transaction data for recordation on the blockchain 120 indicating that the user 150 has received the product as described in the smart contract 160, the smart contract 160 may update its transaction status to indicate the delivery of the product and execute payment as specified in the smart contract 160.

In some embodiments, at step 622, the blockchain system 100 may require the smart contract 160 to carry out a status verification process to verify whether the transaction status should be updated as specified by the transaction data recorded by the user 150. The status verification process may report an error when it determines that the transaction data submitted for recordation by the user 150 is invalid. For example, if the user 150 submitted transaction data for recordation on the blockchain 120 indicating receipt of a product, but the transaction status maintained by the smart contract 160 indicates that the product has not yet been shipped, then the smart contract 160 may report an error message at step 624. Likewise, if the user 150 submitted transaction data for recordation on the blockchain 120 indicating receipt of a product, but the transaction status maintained by the smart contract 160 indicates that the transaction has already been completed, the smart contract 160 may also report an error message at step 624.

In some embodiments, the blockchain system 100 may notify the user 150 through the product identification system 146 about the reported error message at step 626. The user 150 may have the option to use the recorded transaction data and tracking information to trace the origin of the error. On the other hand, if the status verification process finds no error, the smart contract 160 may provide a confirmation at step 624, and the confirmation may be relayed to the user 150 through the product identification system 146 at step 626.

In some embodiments, the user 150 may be required to log out of the terminal device 130 when access to the blockchain system 100 is no longer needed. When the terminal device 130 receives a logout request from the user 150, the terminal device 130 may send a request to the blockchain system 100, e.g., through a connection established with one of the nodes 102-110, to record the user information and the logout timestamp on the blockchain 120. In some embodiments, the terminal device 130 may force the user 150 to log out after a period of inactivity. The user 150 may log in again by repeating the methods described above.

Figure 7:
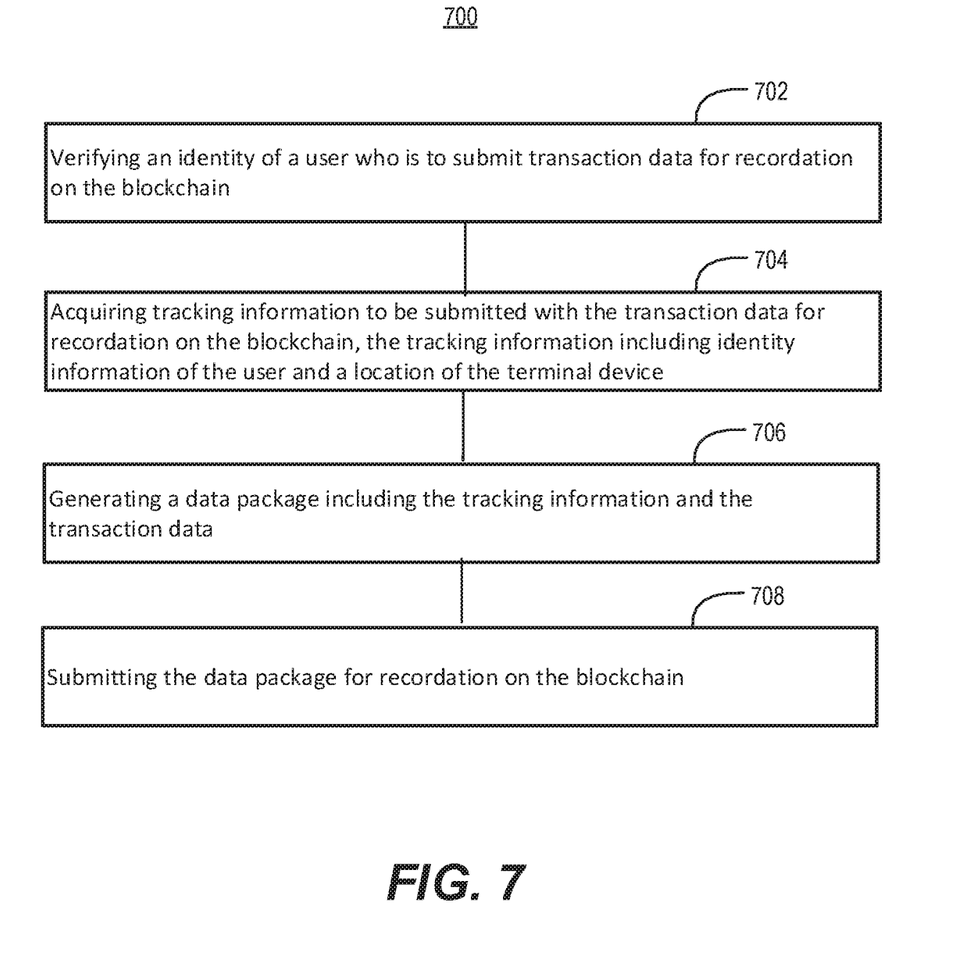
FIG. 7 is a flow chart of a method for acquiring tracking information and recording the tracking information on a blockchain, according to an embodiment.

FIG. 7 illustrates a flow chart of a method 700 for recording tracking information of transaction data submitted for recordation on a blockchain, according to an embodiment. The method 700 may be performed by the terminal device 130 (FIG. 3), which may interact with the blockchain system 100 through connections established with one or more nodes, e.g., the nodes 102-110, of the blockchain system 100 (FIG. 1).

At step 702, the terminal device 130 may verify the identity of a user who is to submit the transaction data for recordation on the blockchain 120. If the user does not have an account created at the terminal device 130, the terminal device 130 may require the user to apply for a new account and use the method 400 (FIG. 4) to carry out the verification process. If the user already has an account created at the terminal device 130, the terminal device 130 may require the user to log into the account and use the method 500 (FIG. 5) to carry out the verification process.

At step 704, the terminal device 130 may acquire tracking information to be submitted with the transaction data for recordation on the blockchain 120. The tracking information may include user information, product information, and location information, which may be acquired using, e.g., steps 602-608 of the method 600 (FIG. 6). At step 706, the terminal device 130 may generate a data package, which may include the tracking information and the transaction data, and prepare the data package for submission to the blockchain system 100 following, e.g., steps 610-614 of the method 600 (FIG. 6). At step 708, the terminal device 130 may submit the data package for recordation on the blockchain 120. The terminal device 130 may submit the data package following, e.g., steps 616-626 of the method 600 (FIG. 6).

As will be appreciated, the above described methods for acquiring and recording tracking information include acquiring verifiable user information, product information, and location information, and recording such information to supplement recordation of transaction data on blockchains. Accordingly, the tracking information, validated by the consensus process provided by the blockchain system, will ensure that the transaction data recorded on the blockchain is accurate and consistent.

Figure 8:
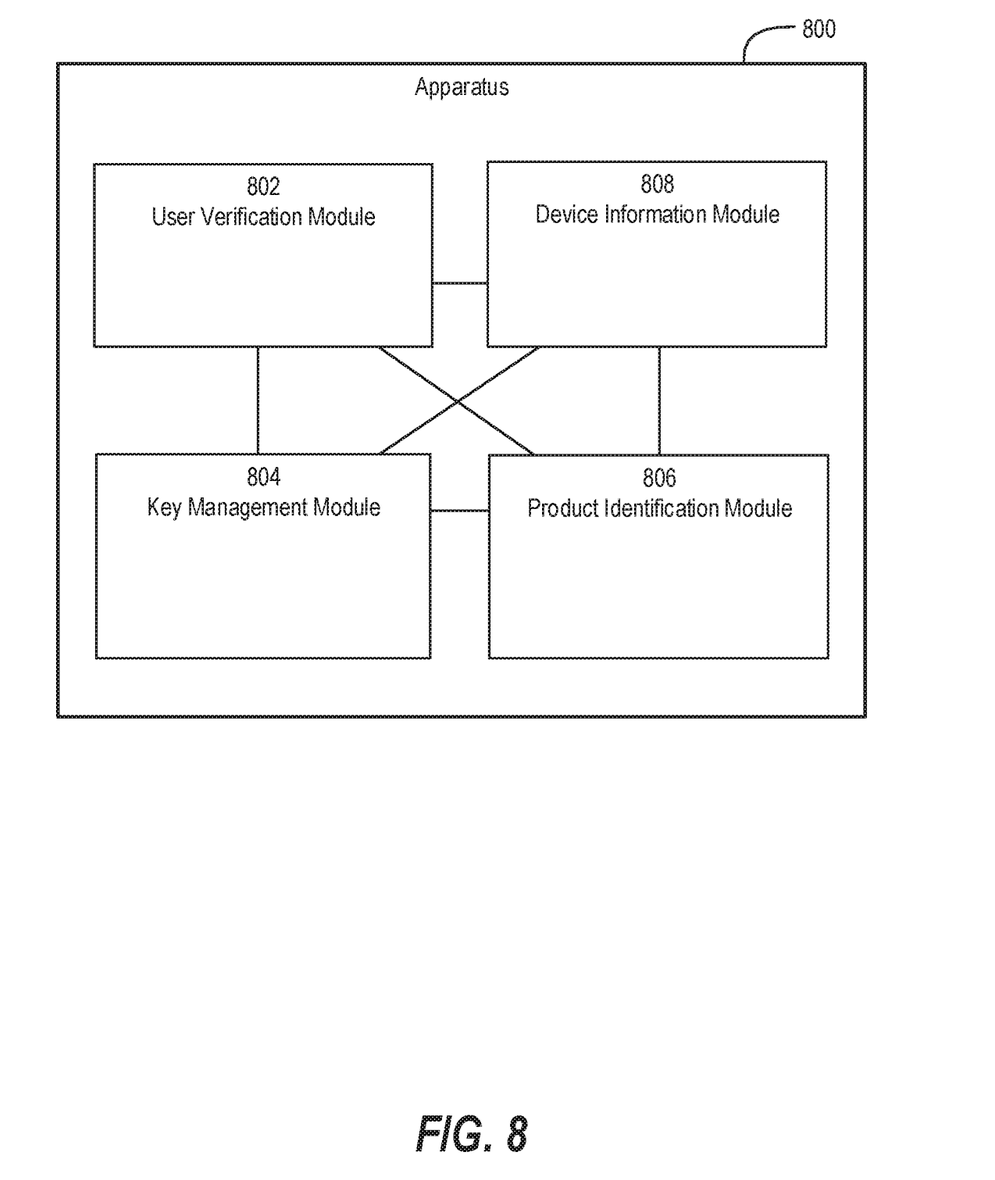
FIG. 8 is a block diagram of an apparatus for acquiring tracking information and recording the tracking information on a blockchain, according to an embodiment.

FIG. 8 is a block diagram of an apparatus 800 for recording tracking information of transaction data submitted for recordation on a blockchain, according to an embodiment. For example, the apparatus 800 may be an implementation of a software process, and may correspond to the method 700 (FIG. 7). Referring to FIG. 8, the apparatus 800 may include a user verification module 802, a key management module 804, a product identification module 806, and a device information module 808.

The user verification module 802 may verify the identity of a user who is to submit the transaction data for recordation on a blockchain, e.g., the blockchain 120 (FIG. 1). If the user does not have an account created at the apparatus 800, the user verification module 802 may require the user to apply for a new account. The key management module 804 may assist the user verification module 802 and manage a cryptographic key pair for the user. If the user already has an account created at the apparatus 800, the user verification module 802 may require the user to log into the account to carry out the verification process.

The product identification module 806 may acquire tracking information to be submitted with the transaction data for recordation on the blockchain 120. The tracking information may include user information, product information, and location information. The device information module 808 may provide information regarding the apparatus 800, such as an identifier for identifying the apparatus 800 and the location of the apparatus 800, which may form a part of the tracking information. The product identification module 806 may generate a data package, which may include the tracking information and the transaction data, and submit the data package to the blockchain system 100 for recordation on the blockchain 120.

Each of the above described modules may be implemented as software, or hardware, or a combination of software and hardware. For example, each of the above described modules may be implemented using a processor executing instructions stored in a memory. Also, for example, each the above described modules may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the described methods. Further for example, each of the above described modules may be implemented by using a computer chip or an entity, or implemented by using a product having a certain function. In one embodiment, the apparatus 800 may be a computer, and the computer may be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an implementation process of functions and roles of each module in the apparatus 800, references can be made to corresponding steps in the above-described methods. Details are omitted here for simplicity.

In some embodiments, a computer program product may include a non-transitory computer-readable storage medium having computer-readable program instructions thereon for causing a processor to carry out the above-described methods.

The computer-readable storage medium may be a tangible device that can store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

The computer-readable program instructions for carrying out the above-described methods may be assembler instructions, instruction-set-architecture (ISA) instructions, machine instructions, machine dependent instructions, microcode, firmware instructions, state-setting data, or source code or object code written in any combination of one or more programming languages, including an object oriented programming language, and conventional procedural programming languages. The computer-readable program instructions may execute entirely on a computing device as a stand-alone software package, or partly on a first computing device and partly on a second computing device remote from the first computing device. In the latter scenario, the second, remote computing device may be connected to the first computing device through any type of network, including a local area network (LAN) or a wide area network (WAN).

The computer-readable program instructions may be provided to a processor of a general-purpose or special-purpose computer, or other programmable data processing apparatus to produce a machine, such that the instructions, which execute via the processor of the computer or other programmable data processing apparatus, create means for implementing the above-described methods.

The flow charts and diagrams in the figures illustrate the architecture, functionality, and operation of possible implementations of devices, methods, and computer program products according to various embodiments of the specification. In this regard, a block in the flow charts or diagrams may represent a software program, segment, or portion of code, which comprises one or more executable instructions for implementing specific functions. It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the diagrams and/or flow charts, and combinations of blocks in the diagrams and flow charts, may be implemented by special purpose hardware-based systems that perform the specified functions or acts, or combinations of special purpose hardware and computer instructions.

It is appreciated that certain features of the specification, which are, for clarity, described in the context of separate embodiments, may also be provided in combination in a single embodiment. Conversely, various features of the specification, which are, for brevity, described in the context of a single embodiment, may also be provided separately or in any suitable subcombination or as suitable in any other described embodiment of the specification. Certain features described in the context of various embodiments are not essential features of those embodiments, unless noted as such.

Although the specification has been described in conjunction with specific embodiments, many alternatives, modifications and variations will be apparent to those skilled in the art. Accordingly, the following claims embrace all such alternatives, modifications and variations that fall within the terms of the claims.

What is claimed is:

1. A computer-implemented method for acquiring and recording tracking information on a blockchain, the method comprising:

performing, by a terminal device, a login verification verifying an identity of a user who is to submit transaction data for recordation on the blockchain, comprising:

collecting at least one biometric feature from the user;

determining whether the user has an existing account created at the terminal device based on the at least one biometric feature;

in response to a determination that the user has an existing account created at the terminal device, processing a request to log into the existing account by receiving a login password from the user and matching the received login password with a password associated with the existing account;

in response to processing the request to log into the existing account, retrieving a cryptographic key pair of the user from a key management system;

generating a log entry for recordation on the blockchain, the log entry including login information of the user or a login timestamp;

signing the log entry using a private key corresponding to the cryptographic key pair of the user;

submitting the signed log entry for recordation on the blockchain; and in response to receiving a confirmation result indicating a successful recordation of the log entry on the blockchain validated by a consensus process provided by the blockchain, allowing the user to use the terminal device to request recordation of the transaction data with tracking information on the blockchain;

acquiring, by the terminal device, the tracking information to be submitted with the transaction data for recordation on the blockchain, the tracking information including identity information of the user and a location of the terminal device;

generating, by the terminal device, a data package including the tracking information and the transaction data; and submitting, by the terminal device, the data package for recordation on the blockchain.

2. The method of claim 1, wherein the determining whether the user has the existing account created at the terminal device further comprises:

determining, by the terminal device, whether the at least one biometric feature collected from the user matches a biometric feature associated with the existing account.

3. The method of claim 1, further comprising:

receiving, by the terminal device, a request to create a new account from the user;

collecting, by the terminal device, a verifiable identification and the at least one biometric feature from the user;

determining, by the terminal device, validity of the verifiable identification and the at least one biometric feature collected from the user; and creating the new account for the user in response to a determination that the verifiable identification and the at least one biometric feature collected from the user are valid.

4. The method of claim 3, wherein the creating the new account for the user comprises:

receiving, by the terminal device, a login password from the user;

creating, by the terminal device, a cryptographic key pair for the user;

submitting, by the terminal device, the verifiable identification and the at least one biometric feature collected from the user for recordation on the blockchain; and storing the verifiable identification and the at least one biometric feature collected from the user at the terminal device to facilitate a subsequent request to log into the new account.

5. The method of claim 1, wherein the acquiring, by the terminal device, the tracking information to be submitted with the transaction data for recordation on the blockchain further comprises:
   identifying, by the terminal device, a product associated with the transaction data;
   acquiring, by the terminal device, product information regarding the product associated with the transaction data; and
   including, in the tracking information, the identity information of the user, the location of the terminal device, and the product information regarding the product associated with the transaction data.

6. The method of claim 5, further comprising:
   including, in the tracking information, a device identifier identifying the terminal device.

7. The method of claim 1, wherein the transaction data being submitted is for updating a smart contract recorded on the blockchain, and the method further comprises:
   receiving, by the terminal device, an error message from a blockchain system indicating an error reported by the smart contract; and
   reporting the error message to the user.

8. The method of claim 7, wherein the error is reported when the smart contract determines that the transaction data submitted is invalid.

9. The method of claim 1, further comprising:
   logging the user out of the terminal device; and
   submitting, by the terminal device, the identity information of the user and a logout timestamp for recordation on the blockchain.

10. A device for recording tracking information of transaction data on a blockchain, comprising:
    one or more processors; and
    one or more computer-readable memories coupled to the one or more processors and having instructions stored thereon that are executable by the one or more processors, wherein the one or more processors are configured to:
    perform a login verification verifying an identity of a user who is to submit transaction data for recordation on the blockchain, comprising:
       collecting at least one biometric feature from the user;
       determining whether the user has an existing account created at the terminal device based on the at least one biometric feature;
       in response to a determination that the user has an existing account created at the terminal device, processing a request to log into the existing account by receiving a login password from the user and matching the received login password with a password associated with the existing account;
       in response to processing the request to log into the existing account, retrieving a cryptographic key pair of the user from a key management system;
       generating a log entry for recordation on the blockchain, the log entry including login information of the user or a login timestamp;
       signing the log entry using a private key corresponding to the cryptographic key pair of the user;
       submitting the signed log entry for recordation on the blockchain; and
       in response to receiving a confirmation result indicating a successful recordation of the log entry on the blockchain validated by a consensus process provided by the blockchain, allowing the user to use the terminal device to request recordation of the transaction data with tracking information on the blockchain;
    acquire the tracking information to be submitted with the transaction data for recordation on the blockchain, the tracking information including identity information of the user and a location of the device;
    generate a data package including the tracking information and the transaction data; and
    submit the data package for recordation on the blockchain.

11. The device of claim 10, wherein in determining whether the user has the existing account created at the terminal device, the one or more processors are further configured to:
    determine whether the at least one biometric feature collected from the user matches a biometric feature associated with the existing account.

12. The device of claim 10, wherein the one or more processors are further configured to:
    receive a request to create a new account from the user;
    collect a verifiable identification and the at least one biometric feature from the user;
    determine validity of the verifiable identification and the at least one biometric feature collected from the user; and
    create the new account for the user in response to a determination that the verifiable identification and the at least one biometric feature collected from the user are valid.

13. The device of claim 12, wherein in creating the new account, the one or more processors are further configured to:
    receive a login password from the user;
    create a cryptographic key pair for the user;
    submit the verifiable identification and the at least one biometric feature collected from the user for recordation on the blockchain; and
    store the verifiable identification and the at least one biometric feature collected from the user at the device to facilitate a subsequent request to log into the new account.

14. The device of claim 10, wherein the one or more processors are configured to:
    identify a product associated with the transaction data;
    acquire product information regarding the product associated with the transaction data; and
    include, in the tracking information, the identity information of the user, the location of the device, and the product information regarding the product associated with the transaction data.

15. A non-transitory computer-readable medium having stored therein instructions that, when executed by a processor of a device, cause the device to perform a method for recording tracking information of transaction data on a blockchain, the method comprising:
    performing a login verification verifying an identity of a user who is to submit transaction data for recordation on the blockchain, comprising:
       collecting at least one biometric feature from the user;
       determining whether the user has an existing account created at the terminal device based on the at least one biometric feature;

in response to a determination that the user has an existing account created at the terminal device, processing a request to log into the existing account by receiving a login password from the user and matching the received login password with a password associated with the existing account;

in response to processing the request to log into the existing account, retrieving a cryptographic key pair of the user from a key management system;

generating a log entry for recordation on the blockchain, the log entry including login information of the user or a login timestamp;

signing the log entry using a private key corresponding to the cryptographic key pair of the user;

submitting the signed log entry for recordation on the blockchain; and in response to receiving a confirmation result indicating a successful recordation of the log entry on the blockchain validated by a consensus process provided by the blockchain, allowing the user to use the terminal device to request recordation of the transaction data with tracking information on the blockchain;

acquiring the tracking information to be submitted with the transaction data for recordation on the blockchain, the tracking information including identity information of the user and a location of the device;

generating a data package including the tracking information and the transaction data; and submitting the data package for recordation on the blockchain.

* * * * *